(12) United States Patent
Sugawara et al.

(10) Patent No.: US 10,007,731 B2
(45) Date of Patent: Jun. 26, 2018

(54) DEDUPLICATION IN SEARCH RESULTS

(75) Inventors: Yu Sugawara, Tokyo (JP); Yoshikiyo Kato, Tokyo (JP); Ryoichi Imaizumi, Tokyo (JP); Ken'ichi Fukushima, Tokyo (JP)

(73) Assignee: Google LLC, Mountain View, CA (US)

( * ) Notice: Subject to any disclaimer, the term of this patent is extended or adjusted under 35 U.S.C. 154(b) by 573 days.

(21) Appl. No.: 13/612,050

(22) Filed: Sep. 12, 2012

(65) Prior Publication Data
US 2015/0161267 A1 Jun. 11, 2015

(51) Int. Cl.
G06F 17/30 (2006.01)

(52) U.S. Cl.
CPC .............. G06F 17/30867 (2013.01)

(58) Field of Classification Search
CPC ......... G06F 17/30864; G06F 17/30867; G06F 17/30554; G06F 17/30991; G06F 17/30887; G06F 17/30696; G06F 17/30882; H04L 67/2814
See application file for complete search history.

(56) References Cited

U.S. PATENT DOCUMENTS

| | | | | |
|---|---|---|---|---|
| 5,913,208 A * | 6/1999 | Brown | .............. | G06F 17/30696 707/706 |
| 6,081,805 A | 6/2000 | Guha | | |
| 6,547,829 B1 * | 4/2003 | Meyerzon | ......... | G06F 17/30864 707/999.002 |
| 6,658,423 B1 * | 12/2003 | Pugh et al. | | |
| 6,876,997 B1 * | 4/2005 | Rorex et al. | | |
| 7,185,088 B1 * | 2/2007 | Joy | ................... | G06F 17/30899 707/999.005 |
| 7,627,613 B1 * | 12/2009 | Dulitz | ............... | G06F 17/30864 |
| 7,689,647 B2 | 3/2010 | Joy et al. | | |
| 7,779,002 B1 * | 8/2010 | Gomes | .............. | G06F 17/30696 707/664 |
| 7,836,108 B1 * | 11/2010 | Kupke | .............. | G06F 17/30705 707/826 |

(Continued)

FOREIGN PATENT DOCUMENTS

GB 2434230 A * 7/2007

OTHER PUBLICATIONS

Bar-Yossef, Ziv, Idit Keidar, and Uri Schonfeld. "Do not crawl in the dust: different urls with similar text." ACM Transactions on the Web (TWEB) 3, No. 1 (2009): 3.*

*Primary Examiner* — Taelor Kim
*Assistant Examiner* — Jesse P Frumkin
(74) *Attorney, Agent, or Firm* — Fish & Richardson P.C.

(57) ABSTRACT

Methods, systems, and apparatus, including computer programs encoded on a computer storage medium, for identifying a plurality of search results that will be provided in response to a search query received from a user device. Two or more of the search results may reference at least two different resources that are responsive to the search query. It may be determined that the user device will be served a same set of content in response to user interaction with each of the two or more search results. In response to the determination, a replacement search result may be generated, including a reference to a resource serving the same set of content. In response to receiving the search query, a search page may be presented that includes the replacement search result and does not include at least one of the two or more identified search results.

17 Claims, 7 Drawing Sheets

(56) References Cited

U.S. PATENT DOCUMENTS

| | | | |
|---|---|---|---|
| 8,037,073 B1* | 10/2011 | Kapoor | G06F 17/30864 706/12 |
| 8,370,390 B1 | 2/2013 | Permakoff | |
| 8,789,177 B1* | 7/2014 | Johnston | H04L 67/02 726/10 |
| 9,104,785 B2* | 8/2015 | Rodriguez | G06F 17/30991 |
| 9,298,836 B1 | 3/2016 | Lerman | G06F 17/30489 |
| 9,342,615 B2* | 5/2016 | Sugawara | G06F 17/30899 |
| 2003/0101286 A1* | 5/2003 | Kolluri | G06F 17/30882 719/316 |
| 2005/0165753 A1* | 7/2005 | Chen et al. | 707/3 |
| 2005/0165800 A1* | 7/2005 | Fontoura | G06F 17/30882 |
| 2006/0041597 A1* | 2/2006 | Conrad et al. | 707/200 |
| 2006/0212451 A1* | 9/2006 | Serdy et al. | 707/10 |
| 2006/0248066 A1* | 11/2006 | Brewer | G06F 17/30696 |
| 2007/0011142 A1* | 1/2007 | Sattler et al. | 707/3 |
| 2007/0112960 A1* | 5/2007 | Joy | G06F 17/30899 709/224 |
| 2007/0266001 A1* | 11/2007 | Williams et al. | 707/2 |
| 2008/0183699 A1* | 7/2008 | Hu et al. | 707/5 |
| 2008/0263026 A1* | 10/2008 | Sasturkar et al. | 707/5 |
| 2008/0301139 A1* | 12/2008 | Wang | G06F 17/30887 |
| 2008/0301281 A1* | 12/2008 | Wang | G06F 21/56 709/224 |
| 2010/0076954 A1* | 3/2010 | Dulitz | G06F 17/30864 707/709 |
| 2010/0268739 A1* | 10/2010 | Zalepa | G06F 17/30887 707/782 |
| 2011/0276561 A1* | 11/2011 | Dulitz | G06F 17/30864 707/709 |
| 2012/0102221 A1* | 4/2012 | Grieve | G06F 17/30887 709/238 |
| 2013/0086083 A1* | 4/2013 | Zou | G06F 17/30864 707/749 |
| 2013/0151377 A1* | 6/2013 | Gudmundsson et al. | 705/26.62 |
| 2013/0151552 A1* | 6/2013 | Sugawara et al. | 707/769 |
| 2013/0232006 A1* | 9/2013 | Holcomb et al. | 705/14.54 |
| 2013/0311860 A1* | 11/2013 | Kritt | G06F 17/30554 715/205 |

* cited by examiner

DEDUPLICATION IN SEARCH RESULTS

BACKGROUND

This specification relates to data processing and search services.

The Internet provides access to a wide variety of resources such as images, video or audio files, web pages for particular subjects, book articles, or news articles. A search system can identify resources in response to a text query that includes one or more search terms or phrases or in response to a non-text query, such as an audio query, video query, or image query. The search system ranks the resources based, at least in part, on their relevance to the query and provides search results that respectively reference (e.g., link to) the identified resources. The search results are typically ordered for viewing according to the rank.

Some content providers may respond to a request for a resource differently depending on the nature of the device that requests it and the circumstances. For example, some content providers may provide one version of a web page to most browsers under the assumption that a full-sized display, such as a desktop monitor, will be used to view the webpage. Another version of the web page optimized for a much smaller display may be provided when the content provider determines that a mobile device is requesting the resource. Furthermore, some websites may redirect to a login page for any user that is visiting the website for the first time, or may automatically redirect external traffic to the home page. Websites may also serve resources based on the location or language of the user, as well as other demographic data.

SUMMARY

In general, one innovative aspect of the subject matter described in this specification can be embodied in methods that include identifying a plurality of search results that will be provided in response to a search query received from a user device. Two or more of the search results may reference at least two different resources that are responsive to the search query. It may be determined that the user device will be served a same set of content in response to user interaction with each of the two or more search results. In response to the determination, a replacement search result may be generated, including a reference to a resource serving the content determined to be served in response to user interaction with each of the two or more search results. In response to receiving the search query, a search page may be presented that includes the replacement search result and does not include at least one of the two or more identified search results.

Identifying the two or more search results may include determining that the two or more search results reference resources that will serve the same set of content when selected by a user device having a particular characteristic; and that that the user device submitting the search query has the particular characteristic.

The particular characteristic may be that the user device is a mobile device.

The two or more search results may be redirected to a same resource when selected by a user device having the particular characteristic, and the replacement search result may reference the resource that the two or more search results will be redirected to.

The replacement search result may be presented as a single search result referencing only the same reference.

The replacement search result may be presented as a cluster of related search results. At least one of the cluster of related search results may reference a resource referenced by one of the two or more search results.

Particular embodiments of the subject matter described in this specification can be implemented so as to realize one or more of the following advantages. The search engine can serve more diverse results and facilitate more efficient user searching by eliminating or identifying duplicate search results.

By identifying, within an existing search index, results that are duplicates for particular devices, the search quality can be improved for multiple devices without creating separate search indexes for those devices. This may reduce costs and increase efficiencies in web crawling, indexing, and serving.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In response to a search query by a user, a search system identifies multiple search results which may normally reference different resources, but will instead lead to the same resource on this occasion when any of the results is selected. The redirection to the same page may occur, for example, because the website includes a mobile-optimized version and the results are requested by a mobile device, or because the site requires a visit to a main page before further pages can be accessed. Although the search results that are identified as leading to the same page are referred to herein as "duplicate search results", it may be understood that the search results may differ in many respects and are considered duplicate results because they lead to the same page.

Upon identifying that the results will redirect to the same page, the search system replaces the search results on a search results page. This replacement may be in the form of serving a search result referencing the redirected page while not serving the other duplicate search results, or clustering the identified results on the search results page. In some implementations, the de-duplication may be identified to the user; in some implementations, the de-duplication may be part of processing the search results and the replacement result presented as any other result.

Figure 1:
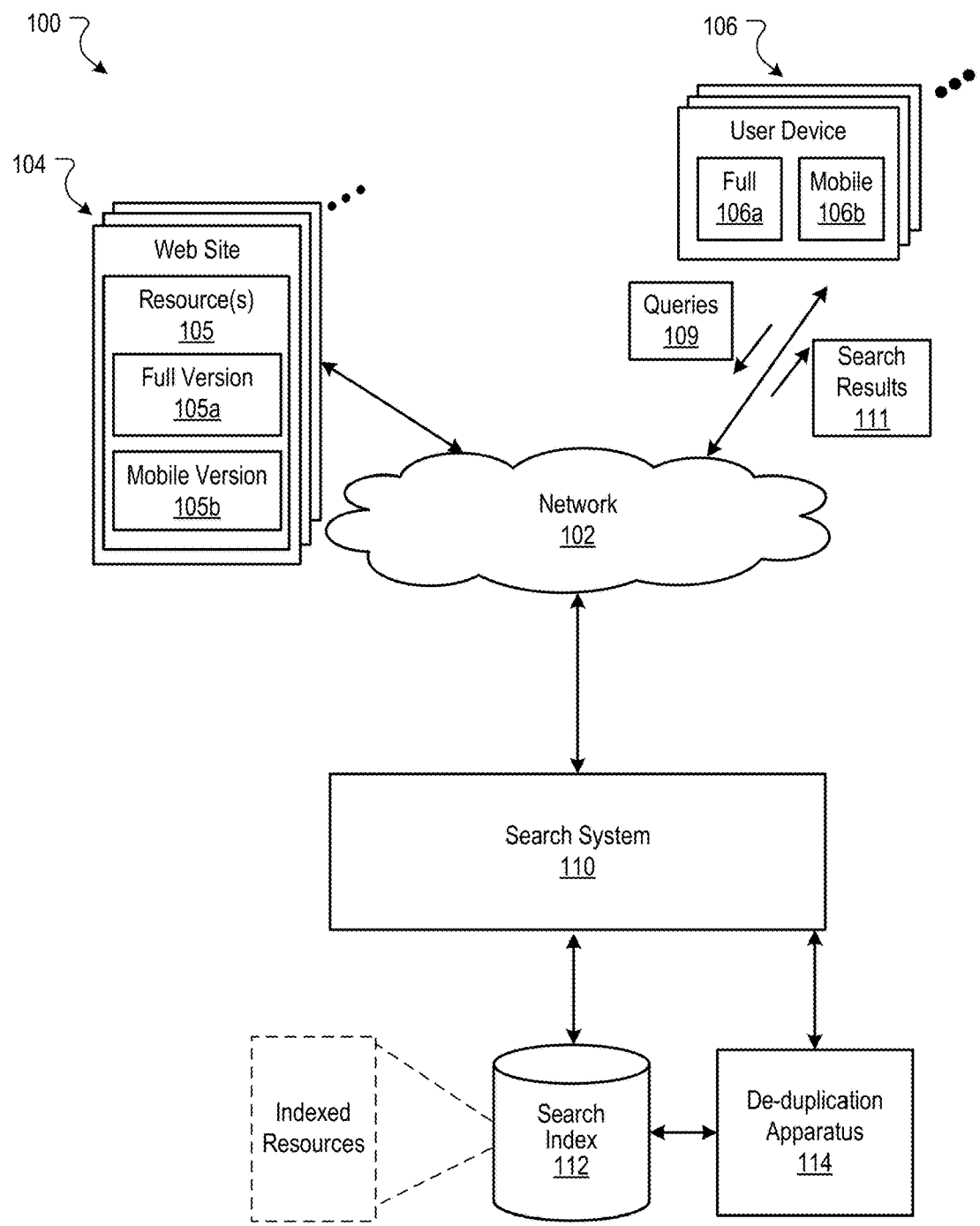
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many thousands of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data provided by a web site 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., scripts).

A web site 104 may include resources 105 with multiple versions 105a, 105b to accommodate different user devices 106. A full version 105a may generally represent the standard or default form of a particular resource 105, and may be formatted for presentation on a full-sized display. Other device-specific versions may be formatted for display on certain devices. For example, a mobile version 105b is a resource optimized for presentation on a mobile device (e.g., a Smart Phone), such as mobile-optimized web pages. Some resources 105 may only be available as a full version 105a, or may have only a single resource 105 that is designed to work on either a full-sized or mobile display.

A user device 106 is an electronic device that is under control of a user and is capable of requesting and receiving resources 105 over the network 102. Example user devices 106 include personal computers, mobile communication devices (e.g., Smart Phones), tablet computing devices, and other devices that can send and receive data over the network 102. A user device 106 typically includes a user application, e.g., a web browser, to facilitate the sending and receiving of data over the network 102. In some implementations, the system may distinguish certain specific devices, such as distinguishing devices 106a having a full-sized display from mobile devices 106b.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 112.

The user devices 106 submit search queries 109 to the search system 110. In response, the search system 110 accesses the search index 112 to identify resources 105 that are relevant to (e.g., have at least a minimum specified relevance score for) the search query 109. The search system 110 identifies the resources 105, generates search results 111 that identify the resources 105, and returns the search results 111 to the user devices 106. A search result 111 is data generated by the search system 110 that identifies a resource 105 that is responsive to a particular search query, and includes a link to the resource 105. An example search result 111 can include a web page title, a snippet of text or a portion of an image extracted from the web page, and the URL of the web page.

In some implementations, the search system 110 may communicate with a de-duplication apparatus 114 in order to identify and replace multiple search results which may lead to the same resource. The de-duplication apparatus 114 may retrieve information from the search index 112 in order to determine duplicate search results, and may interface with the search system 110 in order to generate replacement search results and modified search results pages in response to determining duplicate search results.

In some implementations, if the user device is a mobile device 106b, the search system 110 may identify mobile versions 105b of some resources to return as search results 111, while a device 106a with a full-sized display or any device not identified as a mobile device may be returned search results 111 identifying full versions 105a of these resources.

The search results are ranked based, at least in part, on scores related to the resources 105 identified by the search results 111, such as information retrieval ("IR") scores, and optionally a quality score of each resource relative to other resources. In some implementations, the IR scores are computed from dot products of feature vectors corresponding to a search query 109 and a resource 105, and the ranking of the search results is based on initial relevance scores that are a combination of the IR scores and page quality scores. The search results 111 are ordered according to these initial relevance scores and provided to the user device 106 according to the order.

The user devices 106 receive the search results 111, e.g., in the form of one or more web pages, and render the search results for presentation to users. In response to the user interacting with (e.g., affirmatively selecting or hovering over) a link in a search result at a user device 106, the user device 106 requests the resource 105 identified by the link. The web site 104 hosting the resource 105 receives the request for the resource from the user device 106 and provides the resource 105 to the requesting user device 106.

In some implementations, when the device requesting the link is a mobile device 106b, the web site 104 hosting the resource 105 may return a mobile version 105b of the device rather than a full version 105a that is returned to non-mobile devices 106a. This may occur even if the search results 111 identified the full version 105a of the resource 105, and may involve a redirect from the full version 105a to the mobile version 105b of the resource or may involve serving different content in the mobile version 105b even without a redirect.

Figure 2A:
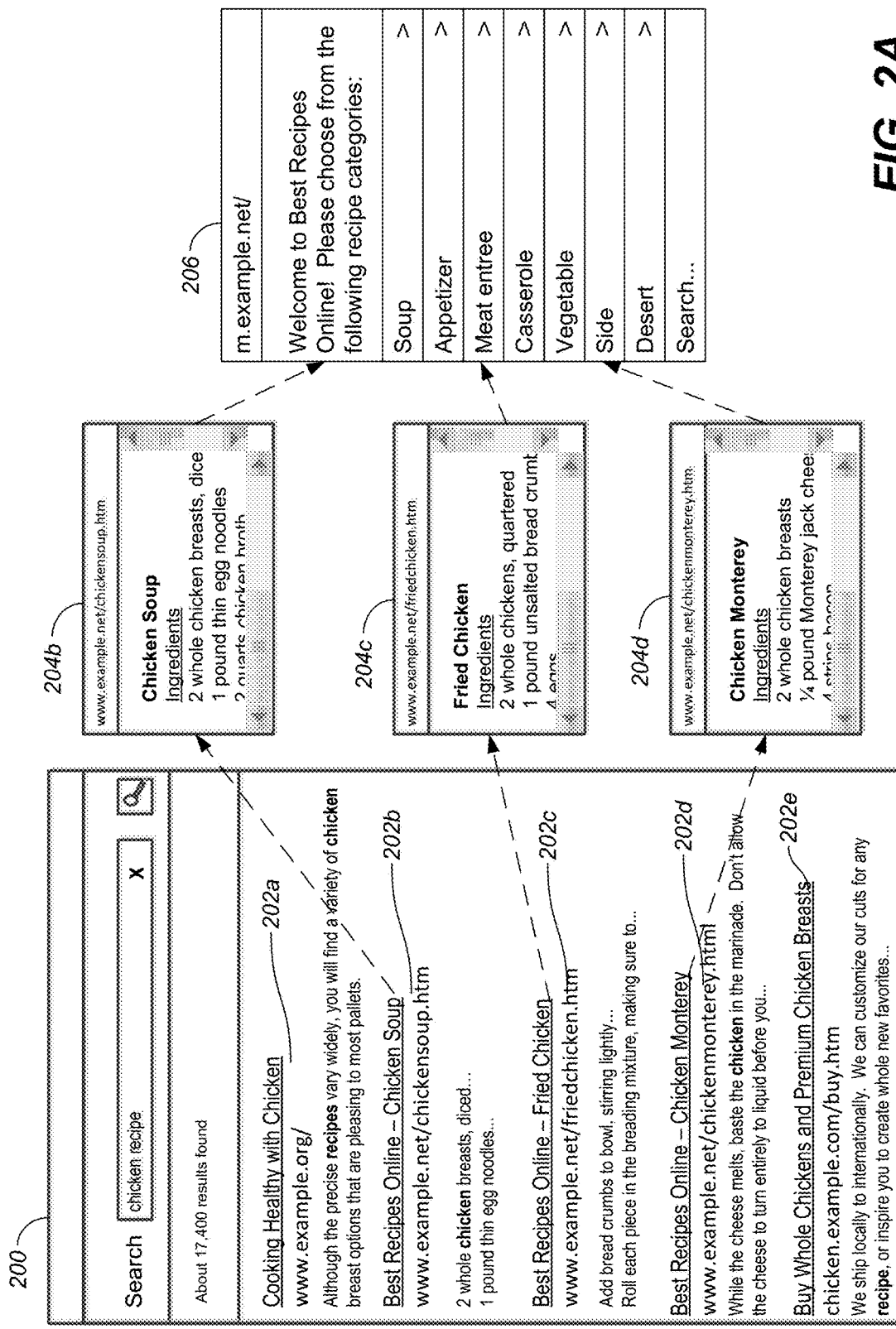
FIG. 2A is an example of a search results page with search results leading to duplicate resources.

FIG. 2A illustrates an example search results page including search results that redirect to the same webpage under certain circumstances. Generally, the example search results page shows multiple search results that each reference different pages from the same site. However, under certain circumstances, a request for one or more of the different pages (e.g., through user interaction with the search results) may result in the user device being redirected to the same front page of a mobile version of the site. In this example, the redirect to the mobile version of the site may occur when the request for one of the different pages is requested by a mobile device. Other example circumstances in which a request for one of many different pages of a site may result in a redirect to a same page can include requests for web pages that can only be accessed after the user is authenticated as being authorized to access the requested page (e.g., by providing credentials, such as a valid username and password). In this example, each request for a page of the site may redirect the user device to a log in page through which the user can provide their credentials.

With reference again to FIG. 2A, the example search page 200 is returned in response to a search query including the terms "chicken recipe". The page 200 includes results 202*a-e*, each of which includes a reference to a particular resource. Three of these resources 204*b-d*, are shown as they may be rendered by a desktop browser. However, in the present illustrated example, the resources will be accessed by a mobile device. As illustrated in FIG. 2, each of the resources 202*b-d* redirects to a default mobile page 206 when requested by a mobile device (which the search system may be aware of due to indexing and other analytic activity as further described below with respect to the process 300 and FIG. 3).

Figure 2B:
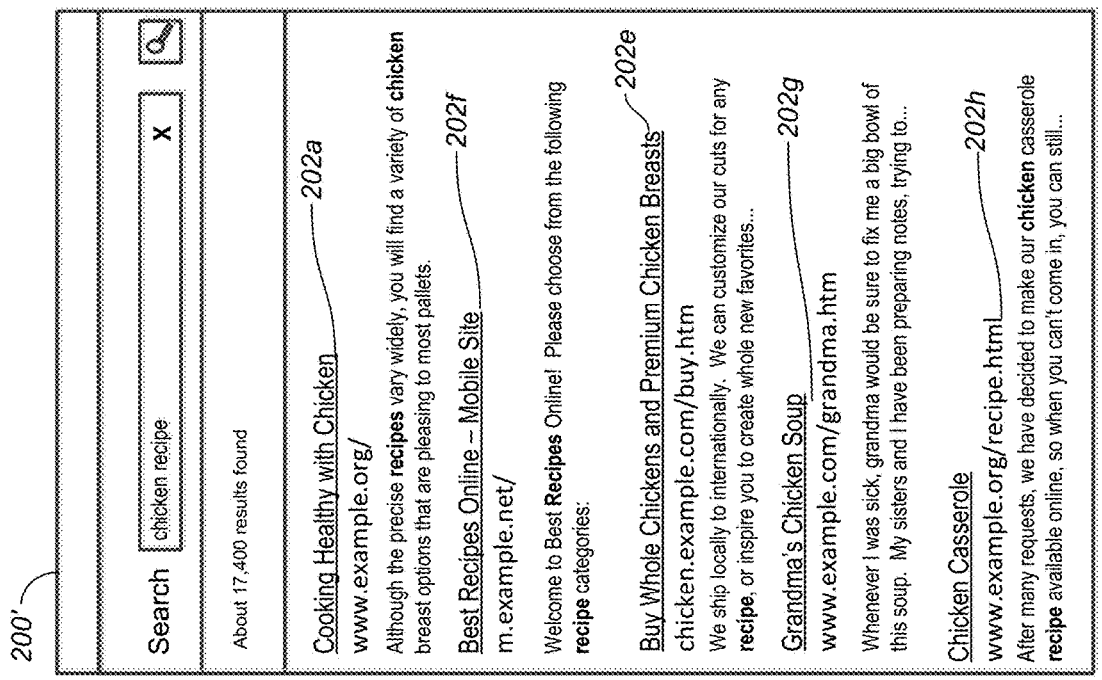
FIG. 2B is a de-duplicated search results page according to some implementations of the present invention.

FIG. 2B shows a search page 200' modified to account for access by a mobile device. Here, because each of the resources 204*b-d* shown above redirect to the same web page, the results 202*b-d* are replaced by a single result 202*f* that references the web page 206 to which user devices are redirect in response to requests for each of the pages referenced by the search results 202*b-d*. The replacement search result 202*f* is displayed in place of the results 202*b-d*, and further results 202*g* and 202*h* are appended to the search results page 200' to take advantage of the space made available by replacing the search results 202*b-d* with a single result 202*f*.

Figure 3:
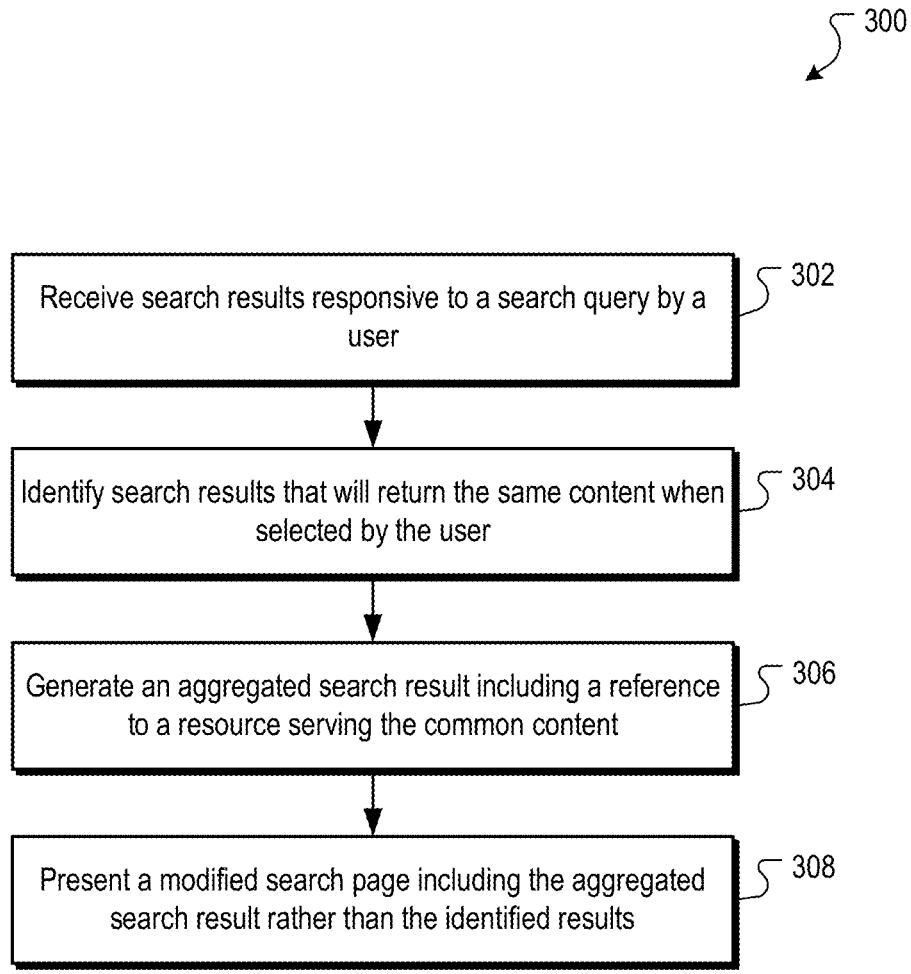
FIG. 3 is a flow chart of an example process for de-duplicating results on a search results page.

FIG. 3 is a flow chart of an example process 300 for de-duplicating search results. In the example of FIG. 3, this process 300 is carried out by a de-duplication apparatus in communication with a search system as part of the process by which the search system responds to a search query by a user. Generally, the search system receives the search query and generates a set of search results, which are then served to the user on a search results page. Each of the results includes a reference to a resource such as a web page; when the user selects one of the search results, the referenced resource is presented to the user, such as by means of a hyperlink or other internet reference protocol.

The de-duplication apparatus receives search results that are responsive to the user's search query (302). The step may occur before or after other steps in which search results are selected for service to a user. In one implementation, the search results that are examined as part of this process are search results that are already selected to be served to the user on a search results page. In some implementations, certain steps of this process 300 may occur earlier in the general search system process, such as when results are originally generated or evaluated as responsive.

The de-duplication apparatus identifies two or more of the search results that will return the same resource when selected by the user (304).

In some implementations, the identification of search results may further include the identification of one or more traits associated with the search query. For example, the de-duplication apparatus or the search system may determine that the search results will be served for presentation on a mobile device, which may be determined in any of several different ways. The page request that includes the search query may further include a header that identifies the device and platform sending the request. The device browser may include a cookie or other code that identifies it as a mobile device. The search results page may be accessed by an application specific to mobile results.

In some implementations, the identification of search results may further include identifying that some of the pages serve duplicate content under certain conditions, which may be performed separate from, and prior to, serving a particular search query. For example, when indexing pages for use in a search system, a web crawler may send requests that include headers indicating the request came from a mobile device. The resulting behavior by the server may be recorded and used to identify duplicate results.

For example, when the web crawler requests two or more web pages from a particular server, the server may identify the request as originating from a mobile device, and may instead redirect the user to a mobile page. The search system may then associate the mobile page with each of the requested pages. When serving search results, if two or more of the results are redirected to the same mobile page, this mobile page may be the same resource identified by the apparatus for de-duplicating the identified results.

In another example, the server may respond to a request identified as originating from a mobile device by serving content modified for the mobile device without redirecting the page or altering the URL. In this way, two or more pages with different URLs may nonetheless transmit the same content to the browser for display on a mobile device.

In some implementations, the web crawler may include data with each indexed web page that uniquely references the device-specific content of that page. For example, a hash of a redirect URL may be used, or a checksum of the HTML content actually served for the page in response to a device-specific request from the web crawler.

For example, two indexed webpages may include the following deduplication data:
www.example.com/page1:
(popular_phone_1=0x1235424, popular_phone_2=0x6176a23, feature_phones=0x4642ff, tablet=0xb16c136)
www.example.com/page2:
(popular_phone_1=0x1235424, popular_phone_2=none, feature_phones=0x4642ff, tablet=0x5614ad3)

In this example, page1 and page2 have the same data for popular_phone_1 and feature phones, but different data for popular_phone_2 and tablet computers. Therefore, in some embodiments, the de-duplication apparatus may identify page1 and page2 as duplicate search results only if the search query is identified with popular_phone_1 or feature phones.

In some implementations, the de-duplication apparatus may detect a website server that automatically redirects new visitors to a main page, login page, or welcome page. In some cases, this may mean that most users that access a search result referencing a specific page will be redirected to the front page. If two or more of these web pages are referenced by the search results, these pages may be considered for de-duplication in many or all cases when received as results to a search query.

Some publishers include code in some pages of their site that redirects users to a main page in order to discourage "deep linking", which is the procedure by which a reference targets a specific page or resource instead of a site's main page. In these situations, almost any reference to a specific page from outside the web site itself (which will include references within search results) will be redirected to the main page.

Further, some web sites require users to log in before accessing content. Any user that does not have a cookie or other indicator that the user is already logged into the site may be redirected to a login page. The de-duplication apparatus may default to de-duplicating multiple pages from these sites.

After the de-duplication apparatus identifies multiple search results that will return the same content, a replacement search result that references a resource serving common content may be generated (306). In some embodiments, the replacement search result may include the same elements as a standard search result but collected from a redirected-to resource—for example, it may have a title, URL, reference, and snippet taken from the body of the resource. In some embodiments, the replacement search result may be an aggregated search result that includes elements from one or more of the identified search results. As shown in FIG. 4B and described further below, the aggregated search result may list the aggregated pages and provide links to them.

The system returns, in response to the query, a modified search results page that includes the replacement search result rather than the identified results (308). As explained above and further illustrated below, the replacement search result may include information from one or more of the identified results or may be a search result that references (e.g., links to) the redirected-to resource.

The replacement search result is included rather than (or in addition to) one or more of the identified results. In some implementations, at least a proper subset of the identified search results are excluded from the search results. Exclusion of identified search results from the search results page may result in visual changes to the rest of the page, such as increasing the ranks of other search results and causing some search results to appear on the page that otherwise would not have been displayed because of space or other considerations.

In some implementations, search results are presented in a ranked order that may reflect the relevance of the results to the search query and other factors. The placement of the replacement result may vary. In some implementations, the replacement result may be given the same rank as one of the identified results that it replaces. For example, the replacement result may occur in place of the highest-ranked of the identified results. Additionally, or alternatively, the rank of the replacement result may be determined based on a function of the ranks of the identified search results that are being replaced by the replacement result. For example, the rank of the replacement search result can be an average, a mean, or a median rank of the identified search results that are being replaced by the replacement result.

In some implementations, the replacement result may be itself be ranked against the other results presented on the search results page and may appear in a position appropriate for its rank. For example, where the replacement result is presented as a search result referencing the redirected-to resource and appearing in the same format as other results, the same scoring that determines the relevance of those other results and their referenced resources may be used on the replacement result and referenced resource in order to rank the replacement search result. In another example, where the replacement result is one of the identified results, the replacement result may maintain the ranking of the identified result it represents.

In general, the process 300 allows for the de-duplication of referenced resources by replacing multiple search results that each redirect user devices to the same resource with a single search result referencing that same resource.

Figure 4A:
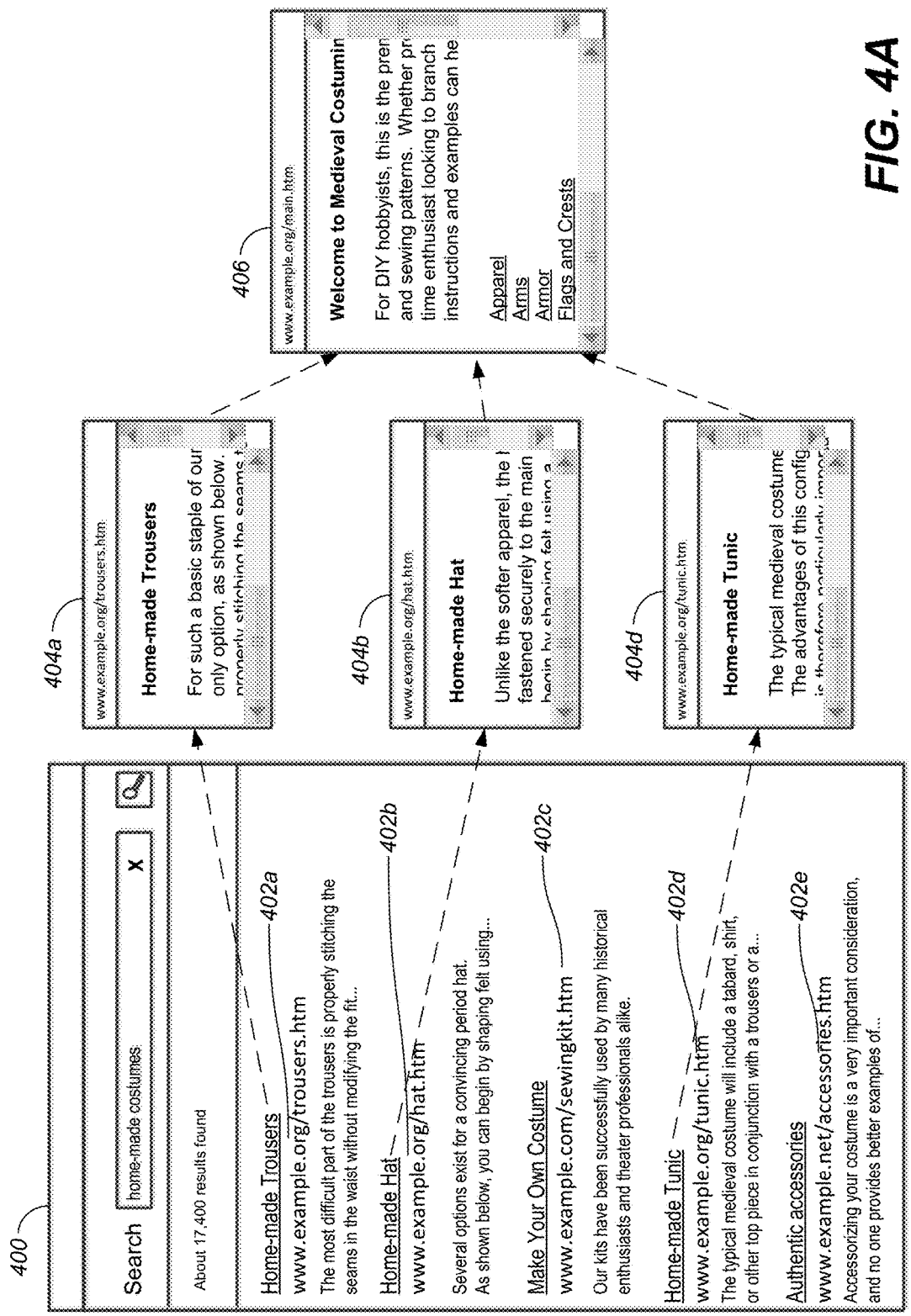
FIG. 4A is an example of a search results page with search results leading to duplicate resources.
Figure 4B:
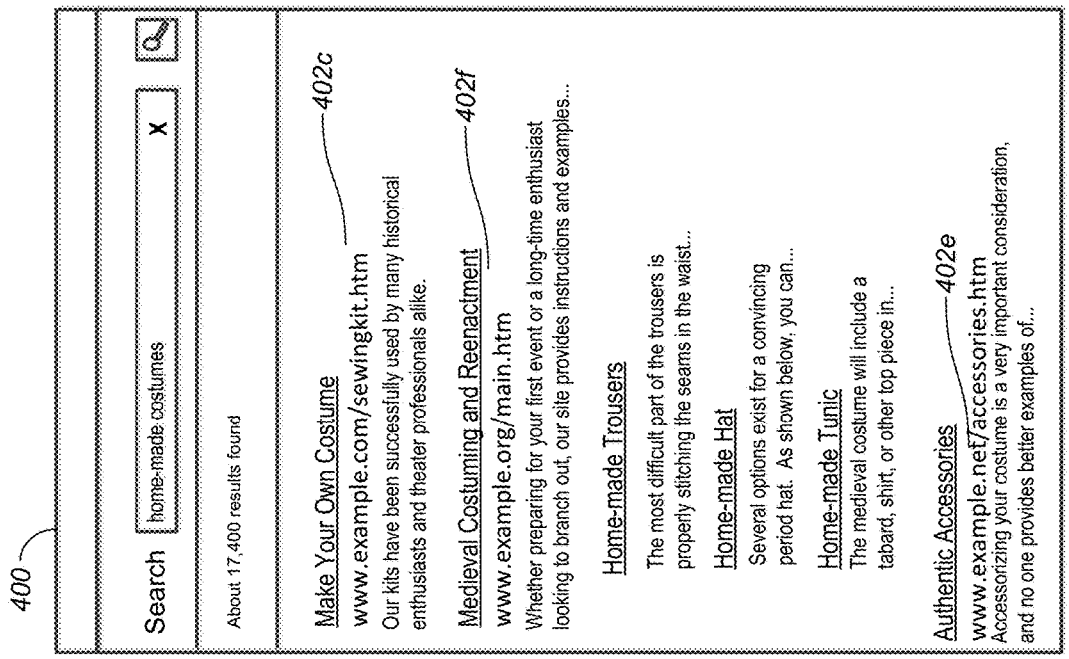
FIG. 4B is a de-duplicated search results page according to some implementations of the present invention.

FIG. 4A illustrates another example of how different search results may redirect to the same resource. FIG. 4B shows a de-duplicated search page as described in this paper.

A search results page 400 shows results in response to the user's query "home-made costumes". The page 400 includes results 402a-e, each of which includes a reference to a particular resource. Three of these resources, 404a, 404b, and 404d, are shown when the specific reference web page 404 is allowed to render. As illustrated in FIG. 4, each of the resources 404a, 404b, 404d redirects to a main page 406 when accessed from an external site.

FIG. 4B shows a search page 400' modified to account for the redirect of the resources. Here, because each of the resources 404a, 404b, and 404d redirect to the same web page 406, the results 402a, 402b, and 402d are aggregated into a single result 402f that references the main page 406 to which user devices are redirected in response to requests for each of the pages references by the search results 202b-d. The aggregated result 404f also includes clustered references for each of the aggregated results. The aggregated search result 402f is displayed in place of the identified results 402a, 402b, and 402d, and in this example is displayed below the search result 402c that now forms the top-ranked result.

Generally, the de-duplicated search results page provides the user with a more direct indication that two or more of the pages are closely related, as well as providing a primary reference that will take the user to the page indicated rather than being redirected from the referenced page to another page.

Figure 5:
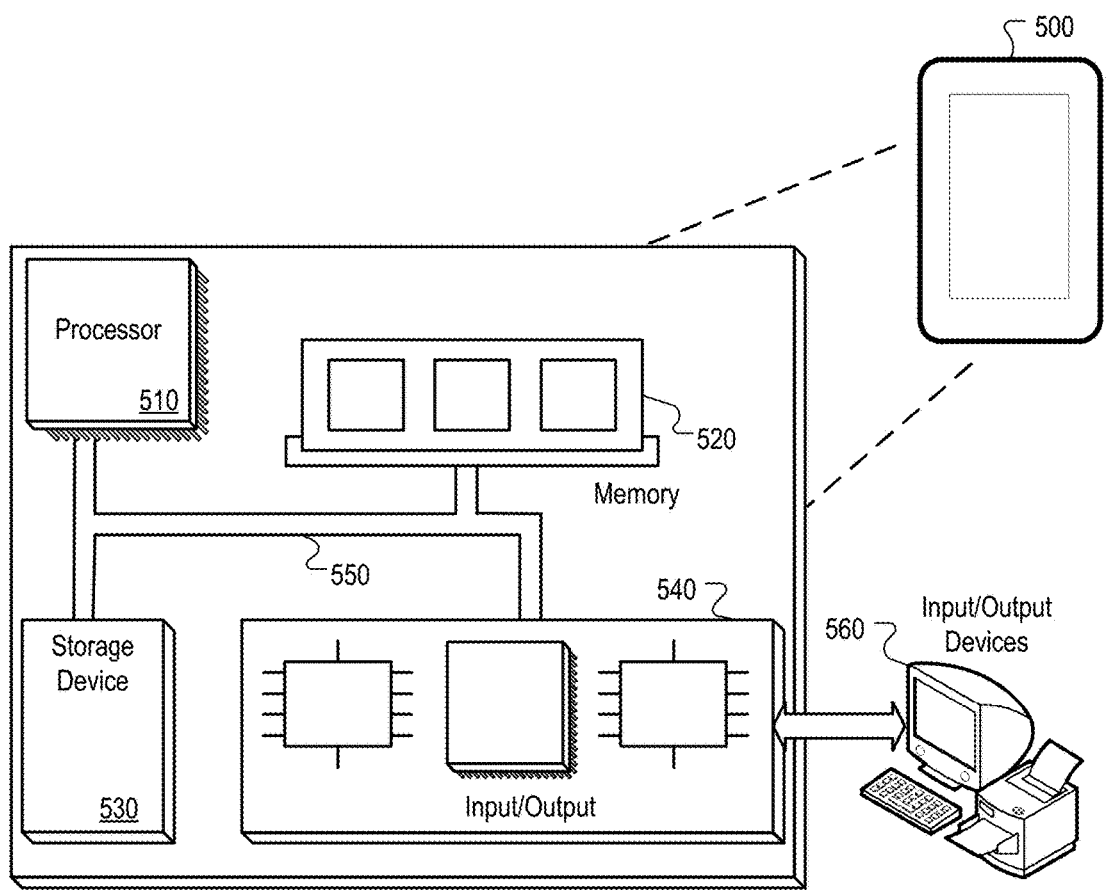
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include a touch screen interface to receive input data and display data to the user, e.g., a tablet computer or mobile communications device. Other implementations, however, can also be used, such as a keyboard, printer, and display devices 560, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
identifying, within a set of search results generated in response to a search of an index using a search query received from a user device, each search result including a respective uniform resource locator that references a particular resource addressed specifically by the respective uniform resource locator and to which the user device is directed when the search result is selected, two non-matching search results, wherein a first search result includes a first uniform resource locator to a first resource, and a second search result includes a second different uniform resource locator to a second different resource;

determining, based on code included in each of the first resource specifying a redirect to a third uniform resource locator and code included in the second resource specifying a redirect to the third uniform resource locator, that the code included in the first resource and the second resource specifies a redirect to a same uniform resource locator specifying a same destination resource for both the first resource and the second resource, that each of the first resource and the second different resource automatically redirect user devices to the same destination resource by use of the same uniform resource locator, and wherein the same uniform resource locator is not included in either the first search result or the second search result;

in response to the determination that each of the first resource and the second different resource redirect user devices to the same destination resource by use of the same uniform resource locator, generating a replacement search result that is different from both the first search result and the second search result and that includes the same uniform resource locator to the same destination resource; and providing a search results page in response to the search query that presents, within the search results, the replacement search result and omits at least one of the two non-matching search results that were determined to redirect to the same destination resource.

2. The method of claim 1, further comprising:
determining that the user device submitting the search query has a particular characteristic, wherein determining that each of the first resource and the second different resource redirect user devices to a same destination resource comprises determining that each of the first resource and the second different resource only redirect user devices having the particular characteristic to the same destination resource.

3. The method of claim 2, wherein determining that the user device submitting the search query has a particular characteristic comprises inspecting a cookie or other code specifying that identifies the user device as a mobile device, and wherein the first resource and second resource are each formatted for display on a non-mobile device, and the destination resource is formatted for display on a mobile device.

4. The method of claim 1, wherein the replacement search result is presented as a single search result that replaces both of the first search result and the second search result.

5. The method of claim 1, wherein the replacement search result is presented with a cluster of related search results.

6. The method of claim 5, wherein at least one search result in the cluster of related search results includes a hyperlink to one of the first resource or the second different resource.

7. A system comprising:
a data storage device storing instructions;
one or more processors, including at least one hardware processor, that interact with the data store, wherein execution of the instructions cause the one or more processors to perform operations comprising:
identifying, within a set of search results generated in response to a search of an index using a search query received from a user device, each search result including a respective uniform resource locator that references a particular resource addressed specifically by the respective uniform resource locator and to which the user device is directed when the search result is selected, two non-matching search results, wherein a first search result includes a first uniform resource locator hyperlink to a first resource, and a second search result includes a second different uniform resource locator hyperlink to a second different resource;

determining, based on code included in each of the first resource specifying a redirect to a third uniform resource locator and code included in the second resource specifying a redirect to the third uniform resource locator, that the code included in the first resource and the second resource specifies a redirect to a same uniform resource locator specifying a same destination resource for both the first resource and the second resource, that each of the first resource and the second different resource automatically redirect user devices to the same destination resource by use of the same uniform resource locator, and wherein the same uniform resource locator is not included in either the first search result or the second search result;

in response to the determination that each of the first resource and the second different resource redirect user devices to the same destination resource by use of the same uniform resource locator, generating a replacement search result that is different from both the first search result and the second search result and that includes the same uniform resource locator to the same destination resource; and providing a search results page in response to the search query that presents, within the search results, the replacement search result and omits at least one of the two non-matching search results that were determined to redirect to the same destination resource.

8. The system of claim 7, wherein the instructions cause the one or more processors to perform operations further comprising;

determining that the user device submitting the search query has a particular characteristic, wherein determining that each of the first resource and the second different resource redirect user devices to a same destination resource comprises determining that each of the first resource and the second different resource only redirect user devices having the particular characteristic to the same destination resource.

9. The system of claim 8, wherein determining that the user device submitting the search query has a particular characteristic comprises inspecting a cookie or other code specifying that identifies the user device as a mobile device, and wherein the first resource and second resource are each formatted for display on a non-mobile device, and the destination resource is formatted for display on a mobile device.

10. The system of claim 7, wherein the replacement search result is presented as a single search result that replaces both of the first search result and the second search result.

11. The system of claim 7, wherein the replacement search result is presented with a cluster of related search results.

12. The system of claim 11, wherein at least one search result in the cluster of related search results includes a hyperlink to one of the first resource or the second different resource.

13. A non-transitory computer storage medium encoded with a computer program, the program comprising instructions that when executed by data processing apparatus cause the data processing apparatus to perform operations comprising:

identifying, within a set of search results generated in response to a search of an index using a search query received from a user device, each search result including a respective uniform resource locator that references a particular resource addressed specifically by the respective uniform resource locator and to which the user device is directed when the search result is selected, two non-matching search results, wherein a first search result includes a first uniform resource locator k to a first resource, and a second search result includes a second different uniform resource locator to a second different resource;

determining, based on code included in each of the first resource specifying a redirect to a third uniform resource locator and code included in the second resource specifying a redirect to the third uniform resource locator, that the code included in the first resource and the second resource specifies a redirect to a same uniform resource locator specifying a same destination resource for both the first resource and the second resource, that each of the first resource and the second different resource automatically redirect user devices to the same destination resource by use of the same uniform resource locator, and wherein the same uniform resource locator is not included in either the first search result or the second search result;

in response to the determination that each of the first resource and the second different resource redirect user devices to the same destination resource by use of the same uniform resource locator, generating a replacement search result that is different from both the first search result and the second search result and that includes the same uniform resource locator to the same destination resource; and providing a search results page in response to the search query that presents, within the search results, the replacement search result and omits at least one of the two non-matching search results that were determined to redirect to the same destination resource.

14. The medium of claim 13, wherein the instructions cause the data processing apparatus to perform operations further comprising:

determining that the user device submitting the search query has a particular characteristic, wherein determining that each of the first resource and the second different resource redirect user devices to a same destination resource comprises determining that each of the first resource and the second different resource only redirect user devices having the particular characteristic to the same destination resource.

15. The medium of claim 14, wherein determining that the user device submitting the search query has a particular characteristic comprises inspecting a cookie or other code specifying that identifies the user device as a mobile device, and wherein the first resource and second resource are each formatted for display on a non-mobile device, and the destination resource is formatted for display on a mobile device.

16. The medium of claim 13, wherein the replacement search result is presented as a single search result that replaces both of the first search result and the second search result.

17. The medium of claim 13, wherein:
the replacement search result is presented with a cluster of related search results; and
at least one of the cluster of related search results search result in the cluster of related search results includes a hyperlink to one of the first resource or the second different resource.

\* \* \* \* \*